United States Patent
Khalfallah et al.

(10) Patent No.: US 9,382,159 B2
(45) Date of Patent: Jul. 5, 2016

(54) COMPOSITION FOR WELL CEMENTING COMPRISING A COMPOUNDED ELASTOMER SWELLING ADDITIVE

(75) Inventors: Ines Khalfallah, Issy les Moulineaux (FR); Matteo Loizzo, Berlin (DE); Katia Dennis, Morangis (FR); Loic Regnault de la Mothe, Le Chesnay (FR); Sylvaine Le Roy-Delage, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 13/640,480

(22) PCT Filed: Apr. 11, 2011

(86) PCT No.: PCT/EP2011/001817
§ 371 (c)(1),
(2), (4) Date: Dec. 13, 2012

(87) PCT Pub. No.: WO2011/131306
PCT Pub. Date: Oct. 27, 2011

(65) Prior Publication Data
US 2013/0075096 A1    Mar. 28, 2013

(30) Foreign Application Priority Data
Apr. 20, 2010 (EP) .................... 10290211

(51) Int. Cl.
*C04B 24/26* (2006.01)
*C04B 28/02* (2006.01)
(Continued)

(52) U.S. Cl.
CPC ......... *C04B 24/2676* (2013.01); *C04B 24/2652* (2013.01); *C04B 28/02* (2013.01);
(Continued)

(58) Field of Classification Search
CPC ........ C04B 12/005; C04B 7/02; C09K 8/473; C09K 8/487
USPC .......................................... 166/294
See application file for complete search history.

(56) References Cited

U.S. PATENT DOCUMENTS

| | | | |
|---|---|---|---|
| 2,849,070 A | 8/1958 | Maly | |
| 2,945,541 A | 7/1960 | Maly et al. | |

(Continued)

FOREIGN PATENT DOCUMENTS

| | | |
|---|---|---|
| EP | 0211408 | 2/1987 |
| EP | 0810239 | 9/2000 |

(Continued)

OTHER PUBLICATIONS

C. M. Dry, "Three designs for the internal release of sealants, adhesives, and waterproofing chemicals into concrete to reduce permeability", Cement and Concrete Research 30 (2000) 1969-1977.

(Continued)

*Primary Examiner* — Angela M DiTrani
*Assistant Examiner* — Ashish Varma
(74) *Attorney, Agent, or Firm* — Jeremy D. Tillman; Michael Flynn; Tim Curington

(57) ABSTRACT

Compositions for well cementing comprise a pumpable slurry of cement, water and at least one additive that swells in contact with an underground fluid (hydrocarbon, water or brines or mixtures thereof). In case of failure of the cement matrix after setting, the additive swells when contacted by the underground fluid and restores zonal isolation. The swelling additive is an elastomer compounded with an aqueous inverse emulsion of particles of a polymer comprising a betaine group.

18 Claims, 3 Drawing Sheets

(51) Int. Cl.
*C09K 8/467* (2006.01)
*E21B 33/14* (2006.01)
*C04B 103/00* (2006.01)
*B82Y 30/00* (2011.01)

(52) U.S. Cl.
CPC .............. *C09K 8/467* (2013.01); *E21B 33/14* (2013.01); *B82Y 30/00* (2013.01); *C04B 2103/0045* (2013.01); *Y02W 30/96* (2015.05); *Y10S 977/773* (2013.01)

(56) References Cited

U.S. PATENT DOCUMENTS

| | | | |
|---|---|---|---|
| 3,385,567 A | | 5/1968 | Case et al. |
| 3,918,523 A | | 11/1975 | Stuber |
| 4,137,970 A | | 2/1979 | Laflin et al. |
| 4,590,227 A | | 5/1986 | Nakamura et al. |
| 4,862,967 A | | 9/1989 | Harris |
| 4,936,386 A | | 6/1990 | Colangelo |
| 5,048,605 A | | 9/1991 | Toon et al. |
| 5,575,841 A | | 11/1996 | Dry |
| 5,660,624 A | | 8/1997 | Dry |
| 5,989,334 A | | 11/1999 | Dry |
| 6,145,591 A * | | 11/2000 | Boncan et al. ............... 166/291 |
| 6,171,386 B1 * | | 1/2001 | Sabins ......................... 106/724 |
| 6,261,360 B1 | | 7/2001 | Dry |
| 6,296,057 B2 | | 10/2001 | Thiercelin |
| 6,431,282 B1 | | 8/2002 | Bosma et al. |
| 6,458,198 B1 | | 10/2002 | Baret et al. |
| 6,527,849 B2 | | 3/2003 | Dry |
| 6,581,682 B1 | | 6/2003 | Parent et al. |
| 6,834,725 B2 | | 12/2004 | Whanger et al. |
| 6,848,505 B2 | | 2/2005 | Richard et al. |
| 6,854,522 B2 | | 2/2005 | Brezinski et al. |
| 6,907,937 B2 | | 6/2005 | Whanger et al. |
| 6,935,432 B2 | | 8/2005 | Nguyen |
| 7,059,415 B2 | | 6/2006 | Bosma et al. |
| 7,121,352 B2 | | 10/2006 | Cook et al. |
| 7,143,832 B2 | | 12/2006 | Freyer |
| 7,576,042 B2 * | | 8/2009 | Lewis et al. .................. 507/221 |
| 7,878,245 B2 * | | 2/2011 | Ravi et al. .................... 166/292 |
| 2004/0020662 A1 | | 2/2004 | Freyer |
| 2004/0055758 A1 | | 3/2004 | Brezinski et al. |
| 2005/0077052 A1 | | 4/2005 | Ohmer |
| 2005/0110217 A1 | | 5/2005 | Wood et al. |
| 2005/0199401 A1 | | 9/2005 | Patel et al. |
| 2006/0005973 A1 | | 1/2006 | Harrall et al. |
| 2007/0027245 A1 | | 2/2007 | Vaidya et al. |
| 2007/0204765 A1 | | 9/2007 | Le Roy-Delage et al. |
| 2008/0017374 A1 * | | 1/2008 | Surjaatmadja ............... 166/281 |
| 2009/0088348 A1 * | | 4/2009 | Roddy et al. ................. 507/224 |
| 2011/0257333 A1 * | | 10/2011 | Adam et al. .................. 524/839 |

FOREIGN PATENT DOCUMENTS

| | | |
|---|---|---|
| EP | 1129047 | 11/2002 |
| EP | 1315883 | 3/2006 |
| EP | 1407113 | 3/2006 |
| EP | 1669540 | 6/2006 |
| EP | 1649136 | 10/2006 |
| EP | 1672166 | 11/2007 |
| EP | 1978071 | 7/2010 |
| GB | 2388136 | 11/2003 |
| GB | 2410515 | 8/2005 |
| GB | 2414495 | 11/2005 |
| WO | 00/37387 | 6/2000 |
| WO | 01/70646 | 9/2001 |
| WO | 02/20941 | 3/2002 |
| WO | 03/008756 | 1/2003 |
| WO | 03/068708 | 8/2003 |
| WO | 2004/101852 | 11/2004 |
| WO | 2004/101951 | 11/2004 |
| WO | 2004101952 A1 | 11/2004 |
| WO | 2005/012686 | 2/2005 |
| WO | 2006/053896 | 5/2006 |
| WO | 2006/065144 | 6/2006 |
| WO | 2006/079659 | 8/2006 |
| WO | 2007039168 A1 | 4/2007 |
| WO | 2008/122372 | 10/2008 |

OTHER PUBLICATIONS

M. Gauthier, T. Carrozzella, A. Penlidis, "Sulfobetaine zwitterionomers based on n-butyl acrylate and 2-ethoxyethyl acrylate: monomer synthesis and copolymerization behavior" Journal of Polymer Science vol. 40, 2002, pp. 511-523.

Wen-Fu Lee; Chan-Chang Tsai: 'Synthesis and solubility of the poly(sulfobetaine)s and the corresponding cationic polymers: 1. Synthesis and characterization of sulfobetaines and the corresponding cationic monomers by nuclear magnetic resonance spectra' Polymer vol. 35, No. 10, 1994, pp. 2210-2217.

V. M. Monroy Soto; J. C. Galin: 'Poly(sulphopropylbetaines): 1. Synthesis and characterization' Polymer vol. 25, 1984, pp. 121-128.

P. Koberle; A. Laschewsky: 'Hydrophobically Modified Zwitterionic Polymers: Synthesis, Bulk Properties, and Miscibility With Inorganic Salts' Macromolecules vol. 27, 1994, pp. 2165-2173.

V. M. Castano; A. E. González; J. Cardoso; O. Manero; V. M. Monroy: 'Evidence of Ionic Aggregates in Some Ampholytic Polymers by Transmission Electron Microscopy' J. Mater. Res. vol. 5, No. 3, 1990, pp. 654-657.

J. C. Salamone; W. Volkson; A.P. Oison; S.C. Israel: 'Aqueous Solution Properties of a Poly(Vinyl Imidazolium Sulphobetaine)' Polymer vol. 19, 1978, pp. 1157-1162.

P. Favresse, A. Laschewsky, "New Poly(Carbobetaine)s Made From Zwitterionic Diallylammonium Monomers" Macromolecular Chemistry and Physics vol. 200, No. 4, 1999, pp. 887-895.

Examination Report issued in related AU Application No. 2011244756 mailed Feb. 21, 2013 (3 pages).

Notice of Acceptance issued in related AU Application No. 2011244756 mailed Mar. 21, 2014 (2 pages).

Extended European Search Report issued in related EP Application No. 10290211.1 mailed Jun. 20, 2011 (9 pages).

International Search Report and Written Opinion issued in related International Application No. PCT/EP2011/001817 mailed Jun. 28, 2011 (11 pages).

* cited by examiner

COMPOSITION FOR WELL CEMENTING COMPRISING A COMPOUNDED ELASTOMER SWELLING ADDITIVE

TECHNICAL FIELD

The present disclosure broadly relates to well cementing. More particularly to cement systems which are "self-healing", i.e. to systems which can adapt to compensate for changes or faults in the physical structure of the cement, or which adapt their structure after the setting phase of the cement.

BACKGROUND

During the construction of wells, cement is used to secure and support casing inside the well and prevent fluid communication between the various underground fluid-containing layers or the production of unwanted fluids into the well.

Various approaches have been developed to prevent failure of the cement sheath. One approach is to design the cement sheath to take into account physical stresses that might be encountered during its lifetime. Such an approach is described in U.S. Pat. No. 6,296,057. Another approach is to include, in the cement composition, materials that improve the physical properties of the set cement. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath. WO 01/70646 and PCT/EP03/01578 describe cement compositions that are formulated so as to be less sensitive to the effects of temperature on the cement when setting.

Nevertheless, the above-described approaches do not allow restoration of the zonal isolation, once the cement sheath has actually failed due to the formation of cracks or microannuli.

A number of self-healing concretes are known for use in the construction industry. These are described in U.S. Pat. No. 5,575,841, U.S. Pat. No. 5,660,624, U.S. Pat. No. 5,989,334, U.S. Pat. No. 6,261,360 and U.S. Pat. No. 6,527,849, and in the document entitled "*Three designs for the internal release of sealants, adhesives, and waterproofing chemicals into concrete to reduce permeability*", Dry, C. M., Cement and Concrete Research 30 (2000) 1969-1977.

Nevertheless, none of these self-healing concretes are immediately applicable to well cementing operations because of the need for the material to be pumpable during placement.

"Self-healing" cement systems were finally developed for oil and gas industry applications. They are described in US 2007/0204765 A1 or WO 2004/101952 A1. These systems deal with the issues of deterioration of the cement sheath over time in a well.

Despite the many valuable contributions from the art, improved pumpable compositions that would be intended to be placed downhole, in a hydrocarbon reservoir, in a water reservoir, in a reservoir containing brines, in a carbon dioxide environment such as, for instance, a carbon dioxide environment encountered in a well in contact with a reservoir for the storage of carbon dioxide gas, thus allowing long-term isolation and integrity of wells in contact with $CO_2$ would be desirable. Hence, such cracks or micro-annuli may create preferable pathways for hydrocarbon fluids or $CO_2$ fluids, such as $CO_2$ saturated brine, gas or supercritical $CO_2$, wet or dry $CO_2$, to migrate to surface.

SUMMARY

The present disclosure aims at well cementing compositions that can be placed downhole by pumping according to the classical manner, and which contain materials that allow the cement sheath to self-heal even in $CO_2$ environment. These "self-healing" $CO_2$ resistant compositions, could be used in usual condition and carbon dioxide application and could repair itself in case of a leak of e.g. brine (saturated with $CO_2$ or not). The swelling particles are added to the cement blend, for example, to the cement blend disclosed in WO 2004/101952, and the design of which is based on tap water and black Dyckerhoff North cement. Due to the cement placement or to stresses applied to the set cement, a physical failure or damage such as a micro-crack might be generated. The swelling particles will then adsorb the water, which makes them swell, and filling the default. The swelling of the particles then generates a strain in the cement matrix that would close the micro-crack. The self healing property is produced by the contact of the water itself, the potential repair mechanism is thus activated if and when needed in case of start of loss of zonal isolation.

Thus, disclosed are compositions for well cementing in a subterranean formation comprising a pumpable slurry of cement, water and at least one additive that swells in contact with hydrocarbons, water or brines and mixtures thereof wherein said swelling additive includes an elastomer compounded with an aqueous inverse emulsion of particles of a polymer comprising a betaine group.

In addition, disclosed are methods of cementing a well in a subterranean formation comprising: compounding an elastomer with an aqueous inverse emulsion of particles of a polymer comprising a betaine group; providing a pumpable slurry of cement, water and at least one additive that swells in contact with hydrocarbons, water or brines and mixtures thereof, said swelling additive including the compounded elastomer; pumping the cement slurry down the well; allowing the cement slurry to set; and allowing the swelling additive to swell in contact with hydrocarbons, water or brines and mixtures thereof.

By "elastomer compounded with an aqueous inverse emulsion of particles of a polymer comprising a betaine group" it is to be understood in the present context: an inverse emulsion comprising a continuous oil-phase, a discontinuous aqueous-phase and particles of polymers dispersed in said aqueous-phase.

BRIEF DESCRIPTION OF THE DRAWINGS

Other features and aspects will be apparent from the following description and appended drawing, in which.

DETAILED DESCRIPTION

Figure 1:
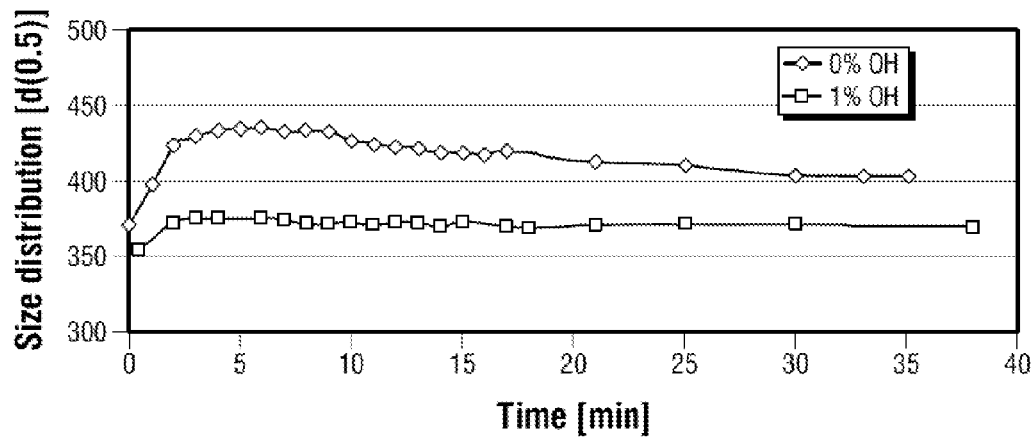
FIG. 1 illustrates the size distribution of a sample of elastomeric particles versus time obtained with light diffusion at ambient temperature, in water.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

This disclosure concerns compositions for well cementing comprising a settable material, water and at least one additive that swells in the case of a structural failure in the set material, in order to provide a physical barrier in the zone of failure. This behavior has the effect of making the material self-healing in the event of physical failure or damage. Examples of settable materials are: cement, microcement, geopolymer, mixture of cement and geopolymer, plaster, resin, phosphomagnesium cement or Chemically Bonded Phosphate Ceramics (CBPCs)

The additive is a material which reacts and/or expands in contact with fluids from the underground formation, which enter a fault in the cement matrix. In particular, when such a material contacts hydrocarbons, water or brines and mixtures thereof or even formation brine saturated with $CO_2$, it swells and fills the micro-cracks or fractures in the cement, and prevents the onset of permeability.

According to embodiments, the additive is dry blended with the settable material and any other solid components before transport to the well-site. The blend is then mixed with water, and the cement slurry is placed in the well.

Once set, it can be self-repaired by hydrocarbon fluid liquids or gas or water fluids coming from the formation or any suitable triggering fluid pumped from surface.

The additive is an elastomer compounded with an aqueous inverse emulsion of particles of a polymer comprising a betaine group. Hence, the additive is made of particles. Since the additive is highly reactive with water, the concentration of additive added to the blend is depending on the slurry density and also on the nature of the polymer. The sizes of the particles and quantities will be selected to allow even dispersion through the cement matrix. A range of materials and/or particle sizes can be used to permit extended behavior over a period of time. A slow imbibing polymer can be used to ensure that sufficient fresh polymer is available to deal with future disturbance in the cement structure.

Preferably, the composition comprises 5 to 20% by volume of blend (BVOB), preferably from 5 to 15% BVOB. Preferably, the particles of polymer have a particle size of between 10 nm to 1 000 000 nm and, more preferably, between 100 000 nm and 900 000 nm.

It is noted that classical other additives can be added to the composition such as dispersing additives, retarder additives, accelerating agents, fluid loss control agents gas generating agents, weighting agents, or other classical additives used to design cement slurries. In particular, the additive can be coupled with other swellable compounds such as rubber, in particular styrene butadiene rubber and ground rubber, poly 2,2,1-bicyclo-heptene (polynorbornene), alkylstyrene, crosslinked substituted vinyl-acrylate copolymers, EPDM (elastomeric terpolymer from ethylene, propylene and non-conjugated diene) or diatomaceous earth and mixtures thereof.

Mixture of two or more of these materials can also be used with the inventive additive, in particular to provide cement that is susceptible to react to a large variety of subterranean hydrocarbons.

A further additive might be envisaged to further enhance the swelling ability of the cement sheath, this can be a material having residual water-absorption properties after the setting of the cement such as super-absorbent polymer (e.g. polymethacrylate and polyacrylamide or a non-soluble acrylic polymers).

Without wishing to be bound by any theory, it has been observed that the particles of the additive swell when incorporated in a cement slurry but they seem to release at least part of the absorbed water during the cement hydration and hence have a reserve of absorbability that allow them to swell again if they are latter exposed to water due to a crack of the matrix for instance. This material will absorb flowing water and swell the cement matrix.

The elastomer is prepared according to a process comprising a step of:

a) making an aqueous inverse emulsion of particles of a polymer comprising a betaine group prepared by inverse emulsion polymerization of monomers $A_b$ comprising a betaine group, optionally other monomers $B_a$ and a small quantity of polyvalent, preferably divalent or trivalent monomers $C_a$, comprised in an aqueous phase dispersed in the form of droplets in a hydrophobic external phase having hydrophobic surfactants, the molar ratio of the monomers $A_b$ to the optional monomers $B_a$ being between 4/96 and 40/60, preferably 7/93 and 30/70, the molar ratio of the polyvalent, preferably divalent or trivalent monomers $C_a$ per mole of polymer which would have been obtained without the addition of monomers $C_a$, being between 1.5 and 10, preferably between 2 and 4, and b) compounding said elastomer with the aqueous inverse emulsion b).

In this application, the term "hydrophobic" is used in its usual sense of "who has no affinity for water", meaning that the organic polymer which it is formed, taken alone (with the same composition and the same molecular weight), will present a macroscopic two-phase solution in distilled water at 25° C. and at a concentration of more than 1% by weight.

In this application, the terms "hydrophilic", "water soluble" and "hydrodispersable" are also used in their usual sense of "who has affinity for water", i.e. not capable of forming a macroscopic two-phase solution in distilled water at 25° C. at a concentration greater than 1% by weight. The term "polymer which would have been obtained without the addition of monomers $C_a$" means the polymer obtained by carrying out the same process with the same monomers except that the monomer $C_a$ is not used.

In this application, the terms "elastomer rubber" and "elastomeric composition" includes any rubber or composition having desired elastomeric and swelling properties for the intended purpose of making an expandible elastomeric material in the presence of water and brine or oil. For example, in some embodiments an elastomeric composition may comprise substantially all elastomers, while in other formulations the elastomer may be accompanied by one or more other polymeric or non-polymeric compositions, such as thermoplastic and thermoset polymers, plasticizers, fillers, shape stabilizers, and the like.

In this application, the term "brine" means any aqueous medium containing dissolved salts like industrial solutions, sea water, sewage fluids. Most common salts are alkaline or earth-alkaline chlorides, sulphates and carbonates.

The elastomeric composition may further comprise additives, fillers, and the like, depending on the end use of the swellable/expandable elastomer. In this application, unless otherwise indicated, the term "molecular weight", means the average molecular weight in absolute mass, expressed in g/mol. That molecular weight can be determined by aqueous gel permeation chromatography (GPC), diffusion of light (DDL or MALLS for an aqueous eluent), with an aqueous or organic eluent (i.e. formamide) depending upon the composition of polymer.

The reduced specific viscosity is measured by dissolving the polymer in a 20% by weight aqueous NaCl solution. The intrinsic viscosity $\eta$ is then obtained by linear extrapolation of the reduced specific viscosity to zero concentration of polymer. The slope of this extrapolation is equal to $k'(\eta)^2$, $k'$ being the Huggins coefficient. This method of calculating $\eta$ is described in detail in the publication Polymer Handbook ($4^{th}$ edition), J. Brandrup, E. H. Immergut and E. A. Grulke, Wiley (1999), cited as reference. This specific viscosity makes it possible to have indirect access to the molecular weights of greater than approximately 2 000 000, which cannot be directly determined experimentally.

According to variants of the process, in step a), a reactive monomer to chemical functions present in the elastomer is added to the aqueous emulsion before its addition to said elastomer.

It is recommended to use 1 to 49% by weight of the aqueous inverse emulsion for 99 to 51% by weight of elastomer, said inverse emulsion preferably comprising between 10 and 40% by weight of water. The monomer $C_a$ is used molar ratio of the polyvalent, preferably divalent or trivalent monomers $C_a$ per mole of polymer which would have been obtained without the addition of monomers $C_a$, being between 1.5 and 10, preferably between 2 and 4, which represents most of the time fact a small quantity of monomer $C_a$. Examples of a small quantity of polyvalent, preferably divalent or trivalent monomers $C_a$ defined otherwise is a quantity comprised between 0.001 and 0.1 mol %, preferably between 0.002 and 0.02 mol %.

According to further aspects, the aqueous inverse emulsion a) can be further partially dehydrated and de-oiled in the form of a dry solid, preferably a dried powder, containing the hydrophilic polymer and its hydrophobic surfactants. That partial or total dehydratation and de-oiling can be spray drying or drying by blowing hot air on the emulsion coated on a flat surface like a plate, wherein water and then oil is partially or totally eliminated. The surfactants used for the stabilization of the polymer in the inverse emulsion polymerization process are most useful to the polymer redispersion in hydrophobic media. In that case, the redispersion of the polymer in any oil is easy to carry out without extensive mixing. It is also possible to obtain the dehydrated polymer without the surfactants by mixing the inverse emulsion with a compound which is a no-solvent of the polymer, preferably by pouring the inverse emulsion in that compound being a no-solvent of the polymer and dissolving at least partially the other components of the inverse emulsion. An example of such a compound is acetone. The use of that dried aqueous inverse emulsion is recommended for the preparation of the powders based on elastomers for example for composite cement applications. In that case the elastomers are more particularly:

a mono-component room temperature vulcanisable silicone (RTV-1 type) curing with the ambient humidity of atmospheric air and comprising a hydrolysable silane and an alpha,omega-dihydroxy silicone oil. That silicone RTV-1 compounded with the dried copolymer inverse emulsion present good swelling in aromatic oils presents a good swelling in water and brine;

a polyurethane rubber based on the curing of an isocyanate functionalized polybutadiene system with a polybutadiene chain extender. That polyurethane compounded with the dried copolymer inverse emulsion present good swelling in aromatic oils;

an EPDM rubber or a nitrile rubber.

The aqueous inverse emulsion of the polymer is thus prepared by an inverse polymerization process comprising the following steps:

a1): preparation of the inverse emulsion, and
a2): polymerization.

Step a1) is carried out by emulsification of a mixture comprising the aqueous phase comprising the monomers, the external phase and at least one emulsifying agent. The polymerization is carried out by bringing together the monomers $A_b$ and, optionally other monomers $B_a$ and the small quantity of polyvalent monomers $C_a$, with a compound which generates free radicals and the polymerization is carried out at a temperature between, for example, ambient temperature and 75° C., depending upon the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

As mentioned above, the polymerization is initiated by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Examples of oil-soluble initiators are azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3/NaHSO_3$ or $KBrO_3/NaS_2O_8$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

The polymer is provided in any practical form, for example, directly in the form of the inverse emulsion as obtained by the polymerization process, or in the form of in the dry solid form or in the vectorized form, for example in the form of a solution or of an emulsion or of a suspension, in particular in the form of an aqueous solution. The vectorized form, for example an aqueous solution, can in particular comprise from 15 to 50% by weight, for example from 20 to 30% by weight, of the polymer.

The betaine group is a group composed of the following monomers:
  alkylsulphonates or -phosphonates of dialkylammonio-alkyl acrylates or methacrylates, acrylamides or -methacrylamides, such as:
  sulphopropyldimethylammonioethyl methacrylate, sold by Raschig under the name SPE:

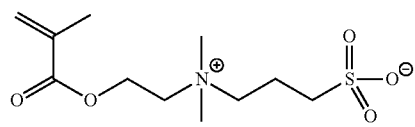

(SPE)

sulphoethyldimethylammonioethyl methacrylate and sulphobutyldimethylammonioethyl methacrylate:

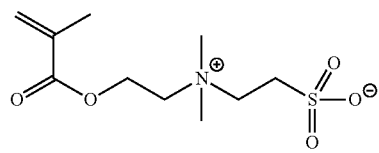

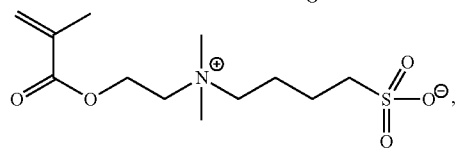

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002),
  sulphohydroxypropyldimethylammonioethyl methacrylate:

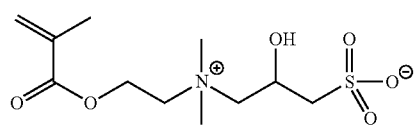

(SHPE)

sulphopropyldimethylammoniopropylacrylamide:

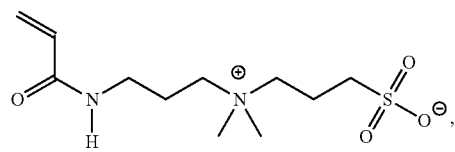 [SMILES: C=CC(=O)NCCC[N+](C)(C)CCCS(=O)(=O)[O-]]

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994),
  sulphopropyldimethylammoniopropylmethacrylamide, sold by Raschig under the name SPP:

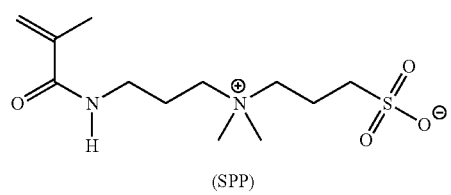

(SPP)

sulphopropyldimethylammonioethyl methacrylate, sold by Raschig under the name SPDA:

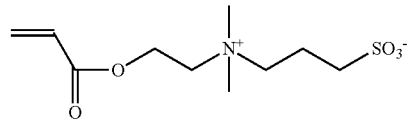

(SPDA)

sulphohydroxypropyldimethylammoniopropyl-methacrylamide:

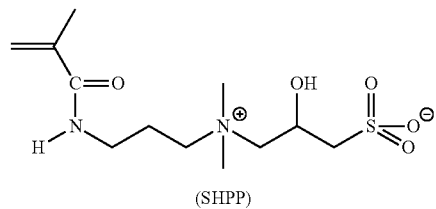

(SHPP)

sulphopropyldiethylammonioethyl methacrylate:

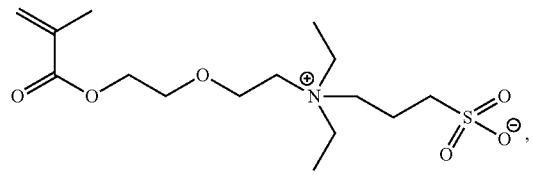 [SMILES: C=C(C)C(=O)OCCOCC[N+](CC)(CC)CCCS(=O)(=O)[O-] ; ","]

the synthesis of which is described in the paper "Poly (sulphopropylbetaines): 1. Synthesis and characterization", V. M. Monroy Soto and J. C. Galin, Polymer, 1984, Vol. 25, 121-128, sulphohydroxypropyldiethylammonioethyl methacrylate:

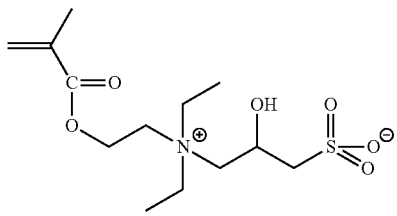 [SMILES: C=C(C)C(=O)OCC[N+](CC)(CC)CC(O)CS(=O)(=O)[O-]]

heterocyclic betaine monomers, such as:
sulphobetaines derived from piperazine:

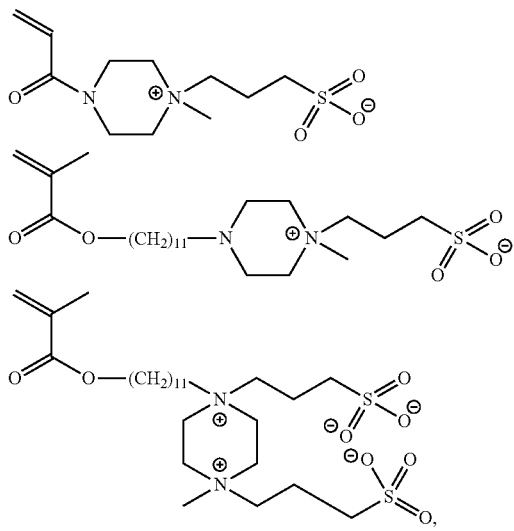

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), sulphobetaines derived from 2-vinylpyridine and 4-vinylpyridine, such as
2-vinyl-1-(3-sulphopropyl)pyridinium betaine (2SPV or "SPV"), sold by Raschig under the name SPV:

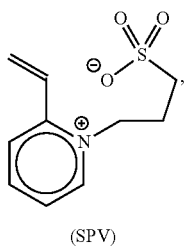

4-vinyl-1-(3-sulphopropyl)pyridinium betaine (4SPV), the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990):

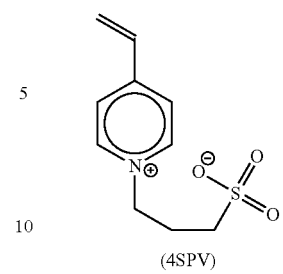

1-vinyl-3-(3-sulphopropyl)imidazolium betaine:

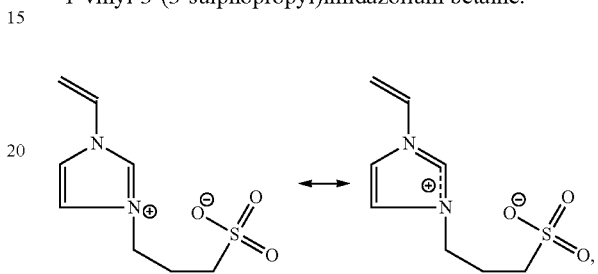

the synthesis of which is described in the paper "Aqueous solution properties of a poly(vinyl imidazolium sulphobetaine)", J. C. Salamone, W. Volkson, A. P. Oison, S. C. Israel, Polymer, 19, 1157-1162 (1978), alkylsulphonates or -phosphonates of dialkylammonioalkylallylics, such as sulphopropyl-methyldiallylammonium betaine:

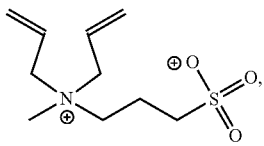

the synthesis of which is described in the paper "New poly(carbobetaine)s made from zwitterionic diallylammonium monomers", Favresse, Philippe; Laschewsky, Andre, Macromolecular Chemistry and Physics, 200(4), 887-895 (1999), alkylsulphonates or -phosphonates of dialkylammonioalkylstyrenes, such as:

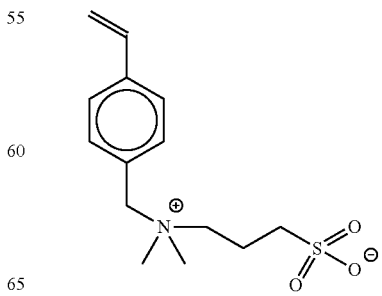

-continued

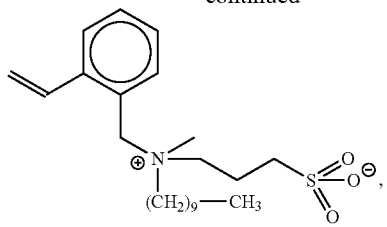

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), betaines resulting from ethylenically unsaturated anhydrides and dienes, such as:

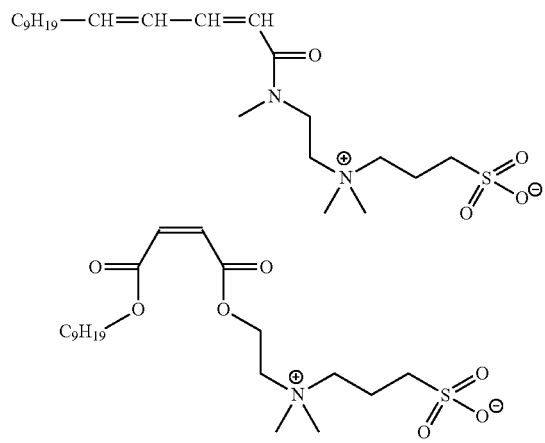

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), phosphobetaines, such as:

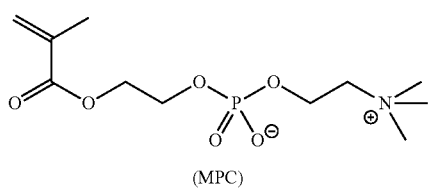 [SMILES: C=C(C)C(=O)OCCOP(=O)([O-])OCC[N+](C)(C)C]

(MPC)

or alternatively:

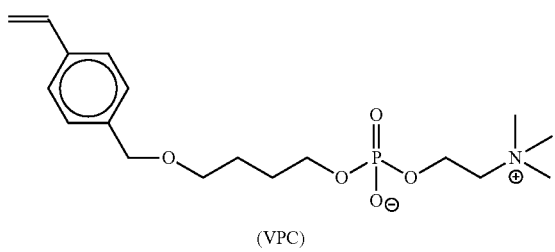

(VPC)

The synthesis of MPC and of VPC is described in EP 810 239 B1 (Biocompatibles, Alister et al.).

The betaines of formula:

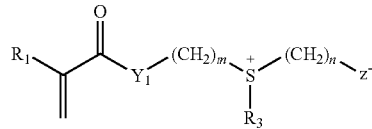

or of formula:

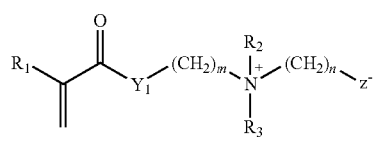

in which:
R$^1$ is hydrogen or methyl,
R$^2$ and R$^3$, which are identical or different, are hydrogen or alkyls having from 1 to 6 carbon atoms,
Y$_1$ is a divalent group of formula —O— or NR$_2$,
Z$^-$ is SO$_3^-$,
m is 2 or 3, and
n is 1-6,
are more particularly preferred.

The monomer A$_b$ is preferably:
sulphopropyldimethylammonioethyl methacrylate (SPE),
sulphoethyldimethylammonioethyl methacrylate,
sulphobutyldimethylammonioethyl methacrylate,
sulphohydroxypropyldimethylammonioethyl methacrylate (SHPE),
sulphopropyldimethylammoniopropylacrylamide,
sulphopropyldimethylammoniopropylmethacrylamide (SPP),
sulphohydroxypropyldimethylammoniopropylmethacrylamide (SHPP),
sulphopropyldimethylammonioethyl acrylate (SPDA),
sulphopropyldiethylammonioethyl methacrylate,
2-vinyl-1-(3-sulphopropyl)pyridinium betaine,
4-vinyl-1-(3-sulphopropyl)pyridinium betaine,
1-vinyl-3-(3-sulphopropyl)imidazolium betaine, or
sulphopropylmethyldiallylammonium betaine.

The monomer A$_b$ corresponds, for example, to one of the following formulae:

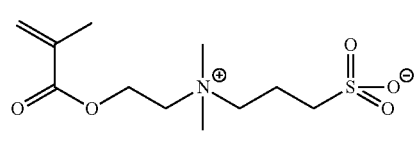

(SPE)

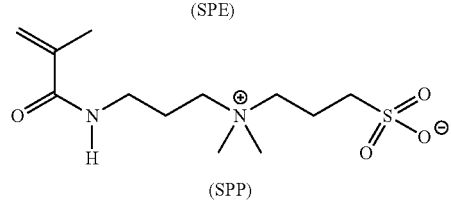

(SPP)

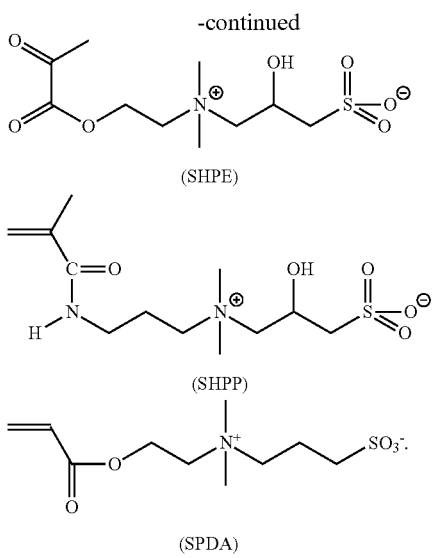

(SHPE)

(SHPP)

(SPDA)

Preferably the monomer $A_b$ is sulphopropyldimethylammonioethyl methacrylate (SPE) and SPP.

The polyvalent monomers are:

1,4-butanediol diacrylate, 1,4-butanediol dimethacrylate, poly(ethylene and/or propylene oxide), if appropriate random or in the block form, diacrylate or dimethacrylate, ethylene glycol diacrylate or dimethadrylate, propylene glycol diacrylate or dimethacrylate, dipentaerythritol pentaacrylate, pentaerythritol tetraacrylate, pentaerythritol triacrylate, trimethylolpropane triacrylate, divinyl esters of polycarboxylic acid, diallyl esters of polycarboxylic acid, triallyl terephthalate, diallyl maleate, diallyl fumarate, diallyl succinate, trimethylolpropane triacrylate, N,N'-ethylenebismethacrylamide, N,N'-ethylenebisacrylamide, N-[2-(acryloylamino)-1,2-dihydroxyethyl]acrylamide, 3-{3-[3-(acryloyloxy)-2-hydroxypropoxy]-2-hydroxypropoxy}-2-hydroxypropyl acrylate.

The polyvalent, preferably divalent or trivalent monomer is preferably N,N'-methylenebisacrylamide (MBA) or triacryloylhexahydrotriazine (TAHT).

The optional monomers Ba used alone or in a polymerizable mixture are preferably:

ethylenically unsaturated carboxylic acid and carboxylic acid anhydride;

ethylenically unsaturated carboxylic acid and carboxylic acid anhydride; or ethylenically unsaturated amine and cationic monomers.

Ethylenically unsaturated carboxylic acid and carboxylic acid anhydride monomers include, but not limited to, acrylic acid, methacrylic acid, ethacrylic acid, α-chloroacrylic acid, α-cyanoacrylic acid, 1-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, 2-methyl-2-butene dicarboxylic acid, maleamic acid, N-phenyl maleamide, maleamide, maleic anhydride, fumaric anhydride, itaconic anhydride, citraconic anhydride, mesaconic anhydride, methyl itaconic anhydride, ethyl maleic anhydride, diethylmaleate, methylmaleate and maleic anhydride.

Ethylenically unsaturated hydroxide and non-ionic monomers include, but not limited to, hydroxyethyl acrylate, hydroxyethyl methacrylate, hydroxypropyl acrylate, hydroxypropyl methacrylate, glycidyl acrylate, glycidyl methacrylate, 2,3-dihydroxypropyl acrylate, 2,3-dihydroxypropyl methacrylate, acrylamide (AM), methacrylamide, N-methylolacrylamide, N-methylolmethacrylamide, N-(2-hydroxyethyl)acrylamide, N-(2-hydroxyethyl)methacrylamide, dimethylacrylamide, dimethylmethacrylamide, poly(ethylene and/or propylene oxide), if appropriate random or in the block form, α-acrylates or α-methacrylates, N-[2-hydroxy-1,1-bis(hydroxymethyl)ethyl]acrylamide, N-[2-hydroxy-1,1-bis(hydroxymethyl)ethyl]methacrylamide vinyl alcohol and vinylpyrrolidone.

Anionic monomers include, but not limited to, the salts of ethylenically unsaturated carboxylic acid and sulfonic acid include sodium (meth)acrylate, sodium itaconate, 2-acrylamido-2-methylpropane sulfonate, sodium styrene sulfonate, sodium vinylsulfonate, sodium allylsulfonate and sodium sulfomethyl(meth)acrylamide.

Ethylenically unsaturated amine and cationic monomers include, but not limited to dimethylaminoethyl (meth)acrylate or (meth)acrylamide, trimethylaminoethyl (meth)acrylate or (meth)acrylamide salts, dimethylaminopropyl(meth)acrylate or (meth)acrylamide, trimethylaminopropyl(meth)acrylate or (meth)acrylamide salts, diethylaminoethyl(meth)acrylate or (meth)acrylamide and diallyldimethylammonium salts.

The polymers are thus prepared by an inverse polymerization process which comprises the following steps:

1): preparation of the inverse emulsion, and
2): polymerization.

Step 1) is carried out by emulsification of a mixture comprising the aqueous phase comprising the monomers, the external phase and at least one emulsifying agent. The polymerization is carried out by bringing together the monomers $A_b$ and optionally the monomers $B_a$ with a compound which generates free radicals and the polymerization is carried out at a temperature between, for example, ambient temperature and 75° C., depending on the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

Step 2): polymerization:

As was said above, the polymerization is triggered by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Mention may be made, as examples of oil-soluble initiators, of azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3/NaHSO_3$ or $KBrO_3/NaS_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

The Following Examples Relate to the Preparation of Aqueous Inverse Emulsion by Inverse Polymerization Example 1

Polymerization in Inverse Emulsion—Poly(Acrylamide/SPP) 90/10 Mol/Mol Crosslinked by 0.0025 Mol % of N,N'-Methylenebisacrylamide (MBA)

The polymer synthesis is composed by 2 steps: emulsion preparation and polymerization.

Emulsion Preparation:

At room temperature in a 2 l glass flask are mixed 26.3 g of Alkamuls S20, 75.1 g of Alkamuls S80, 16.5 g of Rhodibloc RS, 7.1 g of Hypermer B246SF and 797 g of Exxsol D100S. Under magnetic stirring the mixture is kept until limpid solution is obtained (mixture 1). In another 2 l glass flask are mixed 250.9 g of SPP, 1097.2 g of 50% acrylamide, 0.033 g of MBA, 2.44 g of 2,2'-azobis(2-methylpropionamidine)dihydrochloride (Wako V-50) and 2 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 10 s.

Copolymerization:

The polymerization step is carried out by circulating the mixture obtained in step 1 in a continuous tubular reactor wherein the temperature is being kept at 60° C., with a 2 h residence time.

Final product obtained contains 30 to 35% wt of active polymer and the particle size is about 500 to 600 nm average (determined by light scattering using a Malvern Zeta-sizer device, in case of larger particles, microscopic observations are needed to determine the particle size). Particle size can be adjusted by controlling both the surfactant content and the shear applied during the preparation of the emulsion. Practically speaking, particle size is controllable in a range of 150 nm to 50 µm.

Example 2

Polymerization in Inverse Emulsion—Poly(Acrylamide/SPP) 90/10 Mol/Mol Crosslinked by 0.2 Mol % of MBA The process of example 1 is repeated except using 2.644 g instead of 0.033 g of MBA.

Example 3

Polymerization in Inverse Emulsion—Poly(Acrylamide/SPP) 90/10 Mol/Mol Crosslinked by 0.005 Mol % of Triacryloylhexahydrotriazine (TAHT)

The process of example 1 is repeated except using 0.105 g of TAHT instead of 0.033 g of MBA.

Example 4

Polymerization in Inverse Emulsion—Poly(Acrylamide/SPP) 90/10 Mol/Mol Crosslinked by 2 Mol % of p10W. (Polyethylene Glycol Dimethyl Acrylate) Commercialized by the Cognis Company The polymer synthesis is composed by 2 steps: emulsion preparation and polymerization.

Emulsion Preparation:

At room temperature in 3 l glass flask are mixed 32.8 g of Alkamuls S20, 93.9 g of Alkamuls S80, 20.6 g of Rhodibloc RS, 8.9 g of Hypermer B246SF and 1007 g of Exxsol D100S. Under magnetic stirring the mixture is kept until limpid solution is obtained (mixture 1). In 2 l glass flask are mixed 250.8 g of SPP, 1097.3 g of 50% acrylamide, 401.4 g of p10W, 2.44 g of 2,2'-azobis(2-methylpropionamidine)dihydrochloride (Wako V-50) and 1 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 20 s.

Copolymerization:

The polymerization step is carried out by circulating the mixture obtained in step 1 in a continuous tubular reactor wherein the temperature is being kept at 60° C., with a 2 h residence time.

Example 5

Polymerization in Inverse Emulsion—Poly(Acrylamide/SPP) 90/10 Mol/Mol Crosslinked by 0.0025 Mol % of MBA and 0.005 Mol % of PEG400DMA LI The process of example 1 is repeated except adding 0.230 g of PEG400DMA LI. (polyethylene glycol dimethyl acrylate) commercialized by the Cognis company during the preparation of mixture 2.

Comparative Example 6

Polymerization in Inverse Emulsion—Poly(Acrylamide/SPP) 90/10 Mol/Mol

The process of example 1 is repeated except using no crosslinker, MBA.

Example 7

Polymerization in Inverse Emulsion—Poly(Acrylamide/SPP) 90/10 Mol/Mol Crosslinked by 0.05 Mol % of MBA The process of example 1 is repeated except using 0.66 g instead of 0.033 g of MBA.

Example 8

Polymerization in Inverse Emulsion—Poly(Acrylamide/SPP/N-(Hydroxymethyl)Acrylamide) 89/10/1 Mol/Mol/Mol Crosslinked by 0.0025 Mol % of MBA The polymer synthesis is composed by 2 steps: emulsion preparation and polymerization.

Emulsion Preparation:

At room temperature in 2l glass flask are mixed 17.33 g of Alkamuls S20, 49.54 g of Alkamuls S80, 10.85 g of Rhodibloc RS, 4.71 g of Hypermer B246SF and 525.6 g of Exxsol D100S. Under magnetic stirring the mixture is kept until limpid solution is obtained (mixture 1). In another glass flask are mixed 167.3 g of SPP, 723.9 g of acrylamide at 50%, 12.05 g of N-(hydroxymethyl)acrylamide at 48%, 0.022 g of MBA, 1.63 g of 2,2'-azobis(2-methylpropionamidine)dihydrochloride (Wako V-50) and 1.6 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 10 s.

Copolymerization:

The polymerization step of the above mixture is carried out in a continuous tubular reactor by keeping the temperature of the mixture at 60° C. with a 2 h residence time.

Example 9

Polymerization in Inverse Emulsion—Poly(Acrylamide/SPP/N-(Hydroxymethyl)Acrylamide) 80/10/10 Mol/Mol/Mol Crosslinked by 0.0025 Mol % of MBA The process of example 11 is repeated except using 165.3 g instead of 167.3 g of SPP, 643 g instead of 723.9 g of acrylamide at 50%, 119.1 g instead of 12.05 g of N-(hydroxymethyl)acrylamide at 48% and 1.4 g instead of 1.6 g of Versene 100.

The Following Examples Relate to the Preparation and the Testing of Compounds Elastomer/Aqueous Inverse Emulsions.

Swelling Tests

Swelling properties (above 100%) are tested by immersing samples of the elastomer in various fluids. Initial sample dimensions are approximately 3×1×0.35 cm. Swelling tests are run at 60° C. Samples are weighted before immersion (mi) and then ponctually removed from solution, cleaned from excess fluid and weighted (m). The swelling is reported as a percentage using the following formula: % swelling=(m/mi−1)×100.

Aqueous swelling tests are run in either deionised water or salt solutions containing respectively 4% wt NaCl, 4% wt CaCl2 or 20% wt NaCl.

Swelling in oil is run using either a non-aromatic oil EDC 95-11 from Total Fluides or a heavy hydrotreated naphtenic distillates IRM-903 from Calumet Lubricants Co.

Example 10

Silicone Rubber

Inverse emulsion polymer from example 1 is directly blended with commercially available Rhodorsil CAF4 resin (from Blue Star silicones). Resin and inverse emulsion are gently mixed for 5 nm to obtain a fluid homogeneous mixture. Respective quantities of silicone resin and inverse emulsion from example #1 are reported in the table 1 below

TABLE 1

| sample # | polymer content in dry elastomer (% wt) | m silicone resin (g) | m inverse emulsion (g) |
|---|---|---|---|
| 6-1 | 0 | 100 | 0 |
| 6-2 | 15 | 67 | 33 |
| 6-3 | 18 | 60 | 40 |
| 6-4 | 25 | 50 | 50 |

The mixture is then moulded in 3.5 mm thick sheets and let set at room temperature for 4 days. Then unmoulded samples are aged for 3 days at 60° C. in an oven prior performing swelling tests in salted water and in oil and whose results are gathered in tables 2 and 3 below.

TABLE 2

Swelling in 20% NaCl solutions

| polymer content in dry elastomer (% wt) | 7 days (% wt) | 14 days (% wt) |
|---|---|---|
| 0 | 0 | 0 |
| 15 | 80 | 93 |
| 18 | 138 | 155 |
| 25 | 230 | 258 |

Table 2 shows that the swelling increases with the polymer content

TABLE 3

Swelling in oil EDC 95-11

| polymer content in dry elastomer (% wt) | 7 days (% wt) | 14 days (% wt) |
|---|---|---|
| 0 | 86 | 60 |
| 15 | 81 | 82 |
| 18 | 80 | 85 |
| 25 | 61 | 81 |

Table 3 Shows that the Swelling is More Less Independent from the Polymer Content.

Example 11

Polyurethane Rubber

The Polyurethane rubber used is based on an isocyanate functionalized polybutadiene (Krasol N,N-3A) and a polybutadiene chain extender (poly BD R45HT) both from Sartomer. Resins and inverse emulsion are gently mixed for 5 nm to get a fluid homogeneous mixture. Respective quantities of resins and inverse emulsion are reported in table 4 below:

TABLE 4

|  | m(g) | % |
|---|---|---|
| krasol NN-3A | 10 | 23.15 |
| poly BDR45 | 7.5 | 17.36 |
| inverse emulsion | 25.7 | 19.63 |

These elastomers are cured at ambient temperature 2 days then aged 7 days at 60° C. then compounded with the polymerized emulsion from example #1 before performing swelling tests.

The results obtained are gathered in the following table 5 wherein the swelling values are mentioned in % by weight:

TABLE 5

| Swelling Time | 1 day | 7 days | 14 days |
|---|---|---|---|
| naphtenic oil (IRM 903) | 54 | 110 | 118 |
| deionised water | 80 | 236 | 264 |
| 4% CaCl2 | 137 | 236 | 294 |
| 4% NaCl | 140 | 242 | 290 |
| 20% NaCl | 147 | 260 | 294 |

Degree of Crosslinking

Swelling tests with composite polyurethane rubber elastomers are performed in 20% NaCl solutions. If the hydrophilic polymer crosslinking degree is too low or not crosslinked, leak offs can be evidenced by following the long term swelling as illustrated in table 6 below.

TABLE 6

| Swelling Time | 7 days | 14 days | 28 days | 56 days |
|---|---|---|---|---|
| Example #6 (no MBA) | 240 | 230 | 170 | 86 |
| Example #1 (0.0025% MBA) | 270 | 310 | 350 | 190 |
| Example #7 (0.05% MBA) | 260 | 300 | 330 | 320 |

Example 12

Polyurethane Rubber with OH Functional Polymer

The Polyurethane rubber preparation and testing procedure are identical as in example 11

Compounding with the emulsion polymerization of Example #1; 8 and 9

Swelling tests with composite polyurethane rubber elastomers are performed in 20% NaCl solutions and the results are gathered in table 7 below.

TABLE 7

| Swelling Time | 7 days | 14 days | 28 days | 56 days | 84 days |
|---|---|---|---|---|---|
| Example #1 (0.0025% MBA) | 270 | 310 | 350 | 190 | 162 |
| Example #8 (1% AmOH) | 180 | 230 | 284 | 331 | 330 |
| Example #9 (10% AmOH) | 190 | 220 | 247 | 276 | 293 |

AmOH is N-(hydroxymethyl)acrylamide)

Table 7 shows that the incorporation of OH functions on the hydrophilic polymer strongly enhances the stability of the swollen elastomer.

The Following Examples Relate to Compositions, Wherein the Swelling Additive is an Elastomer Compounded with an Aqueous Polymer Inverse Emulsion of Particles of a Polymer Comprising a Betaine Group.

Example 13

Measure of the Swelling Property

Three materials incorporating the elastomers of Examples 11 and 12, and having additional functions on the hydrophilic polymer, that may enhance the stability of the swollen elastomer were studied. The inverse polymer emulsion used respectively correspond to Examples 1, 8 and 9. The swelling property of these materials was measured as in the previous Examples. The test consisted in immersing parallelepipedic pieces of product of initial dimensions approximately equal to 5×1×0.5 cm in either brine or oil for prolonged times in days. Periodically, the parallelepipedic pieces were removed from the liquid, cleaned from excess fluid and then weighted (w). The weight was then compared to the initial weight before immersion to give the swelling property ($w_i$). The parallelepipedic pieces were then immersed again in the liquids for another period of time. The swelling property was expressed in wt % as follows:

$(w/w_i-1)*100$.

Typical swelling (with 0, 1 and 10% OH) was evaluated in saline water ([NaCl]=20 wt %) at ambient temperature and aromatic oil IRM 903 at 60° C. as shown in Table 8 and Table 9 below. Materials from examples 11 and 12 are swellable to both saline water and aromatic oil.

TABLE 8 swelling in 20 wt % NaCl at ambient temperature.
20 wt % NaCl (amb T)

| Immersion time (days) | 1 | 4 | 10 | 22 | 31 |
|---|---|---|---|---|---|
| Example #1 (0.0025% MBA) | 97 | 174 | 201 | 210 | 211 |
| Example #8 (1% AmOH) | 26 | 55 | 90 | 128 | 139 |
| Example #9 (10% AmOH) | 7 | 14 | 20 | 28 | 31 |

AmOH is N-(hydroxymethyl)acrylamide)

TABLE 9 swelling in IRM 903 at 60° C.
IRM 903 at (60° C.)

| Immersion time (days) | 1 | 4 | 10 | 22 | 31 |
|---|---|---|---|---|---|
| Example #1 (0.0025% MBA) | 43 | 85 | 123 | 143 | 148 |
| Example #8 (1% AmOH) | 27 | 58 | 82 | 98 | 103 |
| Example #9 (10% AmOH) | 38 | 82 | 103 | 118 | 121 |

AmOH is N-(hydroxymethyl)acrylamide)

Example 14

Size Distribution of Particles

Different types of these particles have been used with different swelling properties depending on the concentration of the grafting sites in the hydro-swellable material.

FIG. 1 illustrates the size distribution at d(0.5) of a sample swelling material versus time obtained with light diffusion at ambient temperature in water.

The grafting sites concentration ranks from 0% to 10%.

It appears that Increasing the concentration of grafting sites leads to lower particles sizes due to lower swelling rate.

Example 15

Swelling Tests

It has also been confirmed with strips of the same elastomer swollen in brine at 20% NaCl.

Figure 2:
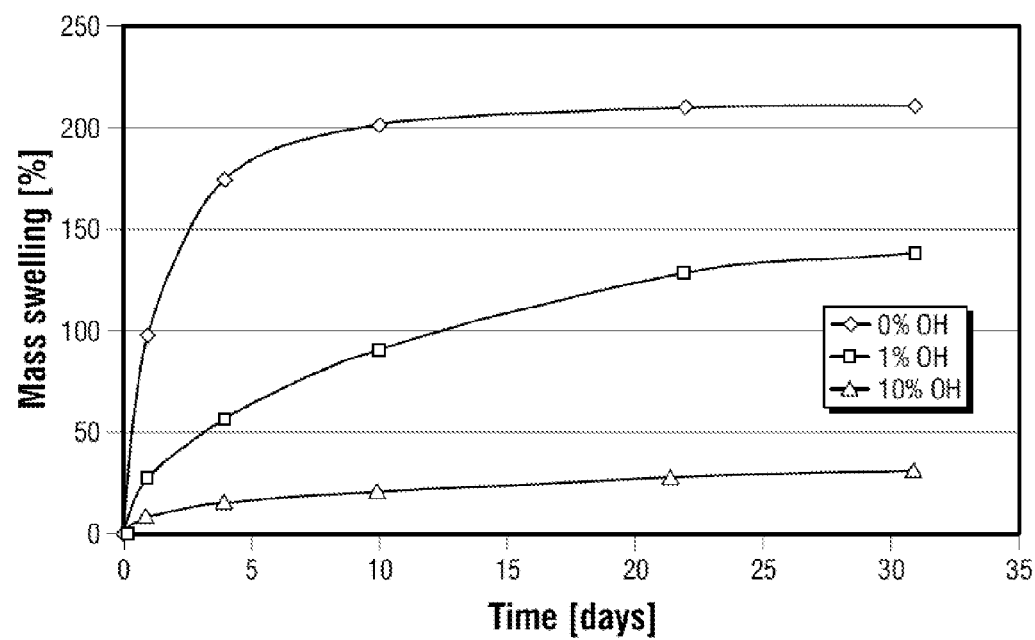
FIG. 2 illustrates the percentage of mass swelling versus time, in 20% NaCl, at ambient temperature, of elastomer samples.

FIG. 2 illustrates the percentage of mass swelling versus time in 20% NaCl at ambient temperature.

Tests have been carried out by incorporating powders of elastomeric particles with 1% of grafting OH sites in the cement blend described in WO 2004/101952. The elastomeric particles occupy 10% of the blend volume. The blend packing volume fraction is then around 0.86.

Properties of the slurry as well as properties of the set cement have been studied. The slurries have been optimized with the mere objective of obtaining stability. Focus was to get homogeneous set material and to obtain an acceptable plastic viscosity PV and yield stress Ty at mixing time and after 20 minutes conditioning at 40° C. Mixing and test procedure was according to API Spec 10.

Different equipment for slurry measurement have been used.

All tests were performed at one slurry density (15.8 lbm/gal) and one temperature (BHCT equal to 40° C.)

Table 10 below relates to the slurry properties with two different batches of elastomeric particles. Bingham model was used to determine Pv and Ty.

TABLE 10

| Slurry | 1$^{st}$ batch | 2$^{nd}$ batch |
|---|---|---|
| BHCT (bottom hole circulating temperature) (° C.) | 40 | 55 |
| Density (SG) | 1.89 | 1.89 |
| Solid Volume Fraction (%) | 58 | 58 |
| Slag cement (% BVOB) | | 25 |
| Hollow microspheres (% BVOB) | | 2.8 |
| Micro silica (% BVOB) | | 10 |
| Coarse particle (% BVOB) | | 52.2 |
| Elastomeric particles 1% OH | | 10 |
| Antifoam (L/T of blend) | 4.5 | 4.5 |
| Polynaphtalene sulfonate (L/T of blend) | 20 | 20 |
| Refined lignosulfonate (L/T of blend) | 4 | 4 |
| Rheology after mixing at ambient temperature (R1B5) | | |
| Pv (cP) | 577.8 | 470.2 |
| Ty (lbf/100 ft2) | 18.7 | 7.1 |
| Rheology after conditioning at 40° C. (BHCT) (R1B5) | | |
| Pv (cP) | 677 | 584 |
| Ty (lbf/100 ft2) | 27 | 6.64 |
| 10 sec gel (lbf/100 ft2) | 24 | 13 |
| 10 min gel (lbf/100 ft2) | 47.5 | 45 |
| 1 min stirring (lbf/100 ft2) | 31 | 25 |
| at 40° C. (BHCT) | | |
| Fluid loss API (mL) | — | 66 |
| Free fluid (mL) | 0 | 0 |
| Sedimentation test (Maximum delta (SG)) | 0.04 | 0.026 |

The coarse particles used are quartz particles used in EverCRETE ™ such as disclosed in a WO 2007/039168 A1.

Figure 3:
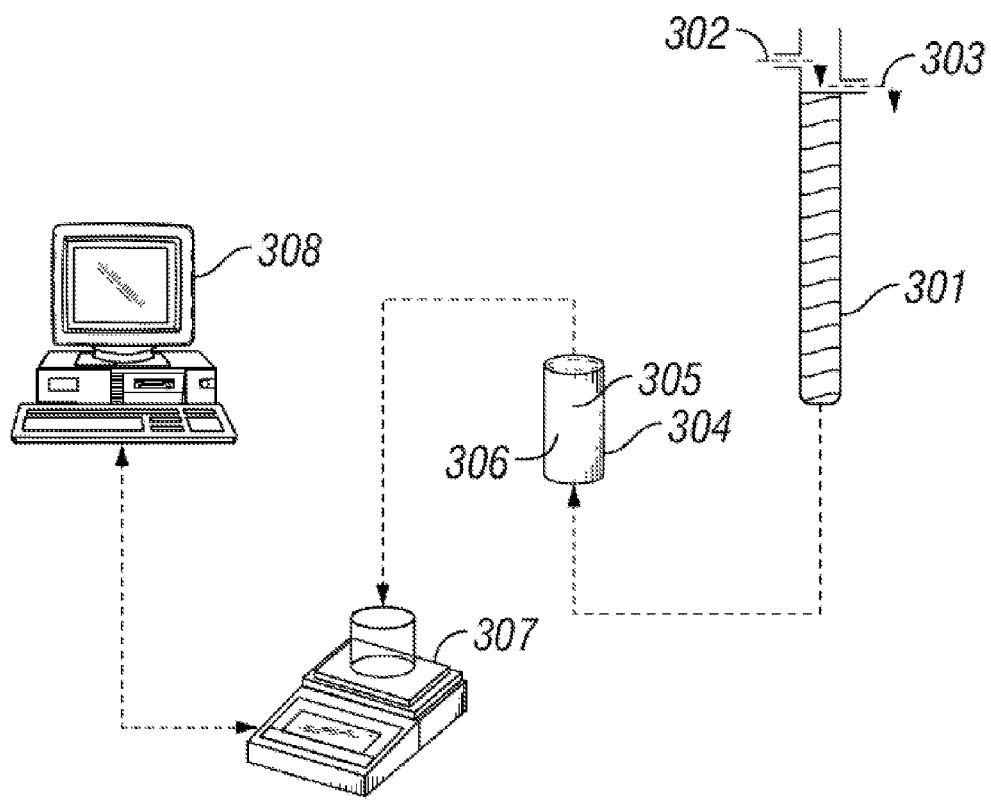
FIG. 3 illustrates a system that has been built for testing the swelling of compositions.

The set cement containing these elastomeric particles keeps the ability to swell when in contact with a water flow. In order to measure this ability, a laboratory-scale apparatus was built (FIG. 3). It comprises a constant pressure system featuring a water column 301 of constant height. The column has a water inlet 302 through which water continuously flows. Excess water is removed by a drain 303. The water pressure during the testing was 0.1 bar. The water column is connected to a test cell 304 made of PVC plastic. The test cell holds the test sample 305 in place. The test sample is made of a cylindrical core of cement (2-inch diameter×2-inch length [5.08-cm diameter×5.08-cm length]) cut in two halves longitudinally. The two halves are placed against each other with the faces maintained at given space apart using a spacer 306. During an injection test the water mass passing through the test sample is measured by a balance 307 and recorded versus time by a computer 308.

Figure 4:
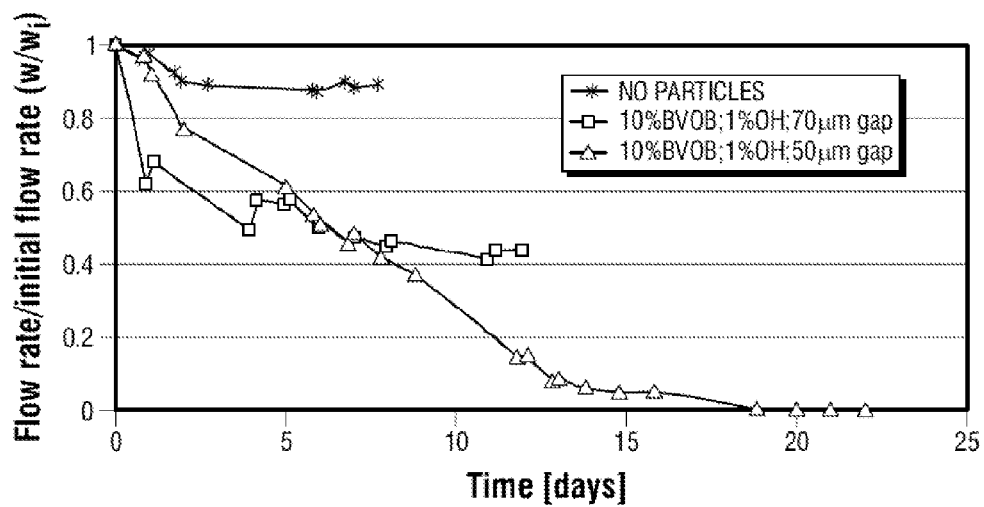
FIG. 4 illustrates the evolution of the flow rate throughout a cement blend containing the swelling additive with various gap sizes.

The curves of FIG. 4 illustrate the evolution of the flow rate throughout the cement blend with various gap sizes. They have been measured for the cement designs summarized in Table 8. Two different gap sizes of 50 micrometers and 70 micrometers have been used. The curve titled 'no particles' corresponds to the cement described in WO 2004/101852 with no elastomeric particles. When the cement composition comprises the swelling elastomeric particles, the flow is decreased drastically and even stopped with a 50 micrometers gap. The cement composition that does not contain the particles is not able to stop the water flow.

The invention claimed is:

1. A composition for well cementing in a subterranean formation comprising a pumpable slurry of an inorganic settable material, water and at least one additive that swells in contact with a fluid that contains $CO_2$, wherein said additive is an elastomer compounded with an aqueous inverse emulsion of particles of a polymer comprising a betaine group, wherein the settable material comprises portland cement, microcement, geopolymer, mixtures of cement and geopolymer, plaster, phosphomagnesium cement or chemically bonded phosphate ceramics or combinations thereof.

2. The composition according to claim 1, wherein the well is an oil well, a gas well or both.

3. The composition of claim 1, further comprising dispersing additives, retarder additives, accelerating agents, fluid loss control agents, or weighting agents or combinations thereof.

4. The composition of claim 1, wherein the additive is present at a concentration between 5% and 20% by volume of solid blend.

5. The composition of claim 1, wherein the particles of polymer have a particle size between 10 nm and 1,000,000 nm.

6. The composition of claim 1, further comprising a swellable compound comprising a rubber, poly 2,2,2-bicyclo-heptene, alkylstyrene, crosslinked substituted vinyl-acetate copolymers an elastic terpolymer of ethylene, propylene and non-conjugated diene monomer or diatomaceous earth or mixtures thereof.

7. The composition of claim 1, further comprising a superabsorbent polymer.

8. The composition of claim 1, wherein OH functions are incorporated as grafting sites of the polymer.

9. The composition according to claim 8, wherein 1% to 10% of the grafting sites of the polymer incorporate OH functions.

10. The composition of claim 1, wherein the polymer comprising a betaine group is prepared by inverse emulsion polymerization of monomers $A_b$ comprising a betaine group, monovalent monomers $B_a$ and polyvalent monomers $C_a$, wherein the emulsion is in the form of an aqueous phase dispersed in a hydrophobic external phase comprising hydrophobic surfactants, the molar ratio of the monomers $A_b$ to the monomers $B_a$ being between 4/96 and 40/60.

11. The composition of claim 10, wherein the quantity of polyvalent monomers $C_a$ is between 0.001 mol % and 0.1 mol %.

12. The composition of claim 1, wherein 1% to 49% by weight of the aqueous inverse emulsion is compounded with 99% to 51% by weight of elastomer.

13. A method for cementing a well in a subterranean formation comprising:
  compounding an elastomer with an aqueous inverse emulsion of particles of a polymer comprising a betaine group;
  providing a pumpable slurry of cement, water and at least one additive that swells in contact with an aqueous saline fluid in case of failure of the cement matrix, said swelling additive being the compounded elastomer;
  pumping the cement slurry down the well;
  allowing the cement slurry to set; and
  in the event of set cement failure, allowing the swelling additive to swell in contact with a fluid that contains $CO_2$.

14. The method of claim 13, wherein the polymer comprising a betaine group is prepared by inverse emulsion polymerization of monomers $A_b$ comprising a betaine group, monovalent monomers $B_a$ and polyvalent monomers $C_a$, wherein the emulsion is in the form of an aqueous phase dispersed in a hydrophobic external phase comprising hydrophobic surfactants, the molar ratio of the monomers $A_b$ to the monomers $B_a$ being between 4/96 and 40/60.

15. The method of claim 13, wherein the cement slurry further comprises dispersing additives, retarder additives, accelerating agents, fluid loss control agents, or weighting agents or combinations thereof.

16. The method of claim 13, wherein the additive is present at a concentration between 5% and 20% by volume of solid blend.

17. The method of claim 13, wherein the particles of polymer have a particle size between 10 nm and 1,000,000 nm.

18. The method of claim 13, wherein the cement slurry further comprises a swellable compound comprising a rubber, poly 2,2,2-bicyclo-heptene, alkylstyrene, crosslinked substituted vinyl-acetate copolymers, an elastic terpolymer of ethylene, propylene and non-conjugated diene monomer or diatomaceous earth or mixtures thereof.

* * * * *